(12) United States Patent
Adams

(10) Patent No.: US 10,588,816 B2
(45) Date of Patent: Mar. 17, 2020

(54) MULTI-FEATURE ADULT MASSAGER

(71) Applicant: Lucas Roy Adams, Canby, OR (US)

(72) Inventor: Lucas Roy Adams, Canby, OR (US)

(*) Notice: Subject to any disclaimer, the term of this patent is extended or adjusted under 35 U.S.C. 154(b) by 194 days.

(21) Appl. No.: 15/488,427

(22) Filed: Apr. 14, 2017

(65) Prior Publication Data
US 2017/0216134 A1 Aug. 3, 2017

Related U.S. Application Data

(63) Continuation-in-part of application No. 15/134,057, filed on Apr. 20, 2016, now abandoned.

(60) Provisional application No. 62/322,680, filed on Apr. 14, 2016, provisional application No. 62/150,135, filed on Apr. 20, 2015.

(51) Int. Cl.
| | | |
|---|---|---|
| A61H 19/00 | (2006.01) | |
| A61H 7/00 | (2006.01) | |
| G02B 21/26 | (2006.01) | |
| G02B 21/36 | (2006.01) | |

(52) U.S. Cl.
CPC .............. *A61H 19/30* (2013.01); *A61H 7/003* (2013.01); *A61H 19/40* (2013.01); *G02B 21/26* (2013.01); *G02B 21/367* (2013.01); *A61H 2201/1692* (2013.01); *A61H 2205/087* (2013.01)

(58) Field of Classification Search
CPC ................ A61H 15/00; A61H 15/0092; A61H 2015/005; A61H 2015/0064; A61H 2201/0123; A61H 2201/1284; A61H 2201/1695; A61H 2205/081; A61H 19/34; A61H 19/32; A61H 19/50; A61H 23/0263; A61H 2201/0153; A61H 19/40; A61H 19/30; A61H 2201/0107; A61H 23/00; A61H 19/00; A61H 2015/0042; A61H 21/00; A61F 2007/0087
See application file for complete search history.

(56) References Cited

U.S. PATENT DOCUMENTS

2013/0190664 A1* 7/2013 Johnson ............. A61H 15/0092
601/129

* cited by examiner

*Primary Examiner* — Christine H Matthews

(57) ABSTRACT

A multi-feature adult massager has a plurality of cavities that traverse into and intersect within a structural body made from a soft material for massaging purposes. The cavities are internally textured in various different ways, providing a variety of massaging experiences. Furthermore, multiple entrances enable multiple users to participate simultaneously. The structural body has a geometric shape that facilitates placement and orientation of the internal cavities.

5 Claims, 12 Drawing Sheets

MULTI-FEATURE ADULT MASSAGER

The current application claims a priority to the U.S. Provisional Patent application Ser. No. 62/322,680 filed on Apr. 14, 2016.

FIELD OF THE INVENTION

The present invention relates generally to human sexuality. More particularly, the present invention relates to an adult massaging device.

BACKGROUND OF THE INVENTION

Present day there are many adult massaging devices on the market, though many of them contain or use a very hard shell or internal structure, or are incapable of an effective self-support system. Furthermore, many of these devices only have very specific textures, no variety of softness within one device, no internal portals, few entrances, predictable textures and massaging experiences. It is therefore an objective of the present invention to overcome such problems.

DETAIL DESCRIPTIONS OF THE INVENTION

Figure 1:
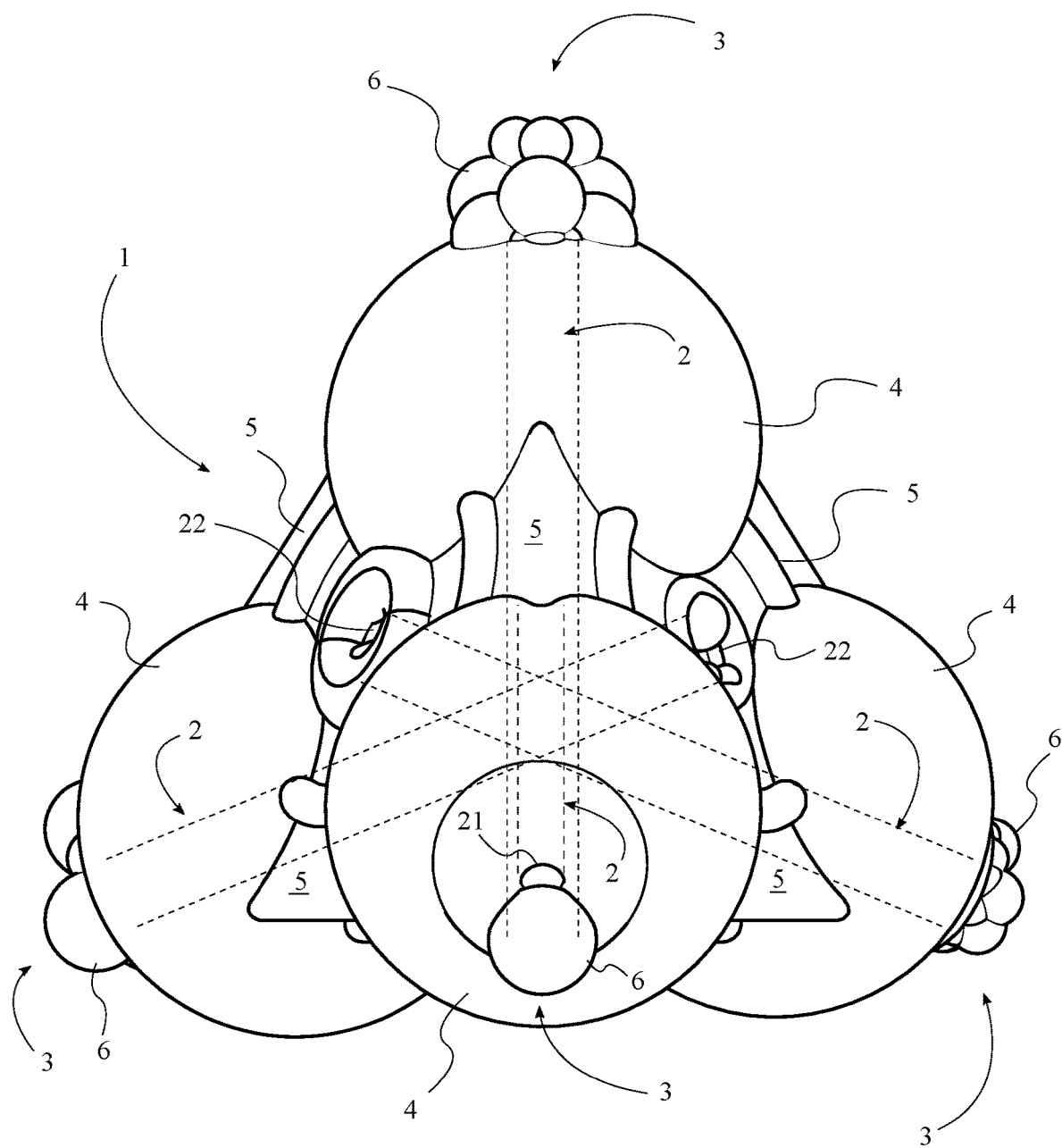
FIG. 1 is a side view of one embodiment of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention relates generally to a system of production, structure, and function in relation to an adult massaging system for use in human sexual practices. The present invention provides a device with a solid structure with multiple cavities and entrances within the device with varied textures, massaging features, and differences in material softness, allowing a wide range of possible experiences for the user. A variety of tubes of different shapes, sizes, material softnesses, and textures traverse through the device, intersecting in the middle of the device. In general, the number of intersecting tubes should be understood to not be limited by the current disclosure. The present invention may comprise as few as two tubes, and as many as is physically possible to create. The tubes create a "throat cavity" design, and the multiple tubes traverse from the outer layer of the device toward the center of the device from multiple radial angles distributed around the center of the device.

The outer surface of the device may comprise multiple geometric shapes in various sized and patterns. It is desirable for the present invention to have a high amount of entrances for maximum potential different texture experiences. The device is designed to be a completely comfortable experience for a human person, no matter how vigorous the interaction, as it is entirely soft and contains no hard material supports, as the support system is built in and is completely soft, thereby preventing any potential bruising or injury that can be caused by vigorous use. The device is designed for multiple situations: single user use, and multiple user use via multiple entrances.

Some embodiment comprise outer textures meant to stimulate the skin on a person's hands as well as any other skin surface it comes in contact with, as the outer surface is made of a soft supportive material.

Furthermore, the device can be used as a support for any commonly used male sex organ shaped device or similar shaped device, as the male sex organ or similar shaped device can be placed inside of the proposed design for a sensual massaging experience as the male sex organ or similar shaped device is kept in a vertical position, and the proposed invention also acts as a massaging cushion that is also acting as a support holding the vertically oriented male sex organ or similar shaped device in place. This is a more effective and engaging approach to keeping it vertical compared to other systems such as suction cups, as the proposed device can be placed on any flat or angular surface and can be compressed down to almost the base of the male sex organ shaped device without damage to the proposed invention device and with great comfort for the user, even if the male sex organ device has not been modified or equipped with the proper adornments to perform vertically.

Figure 2:
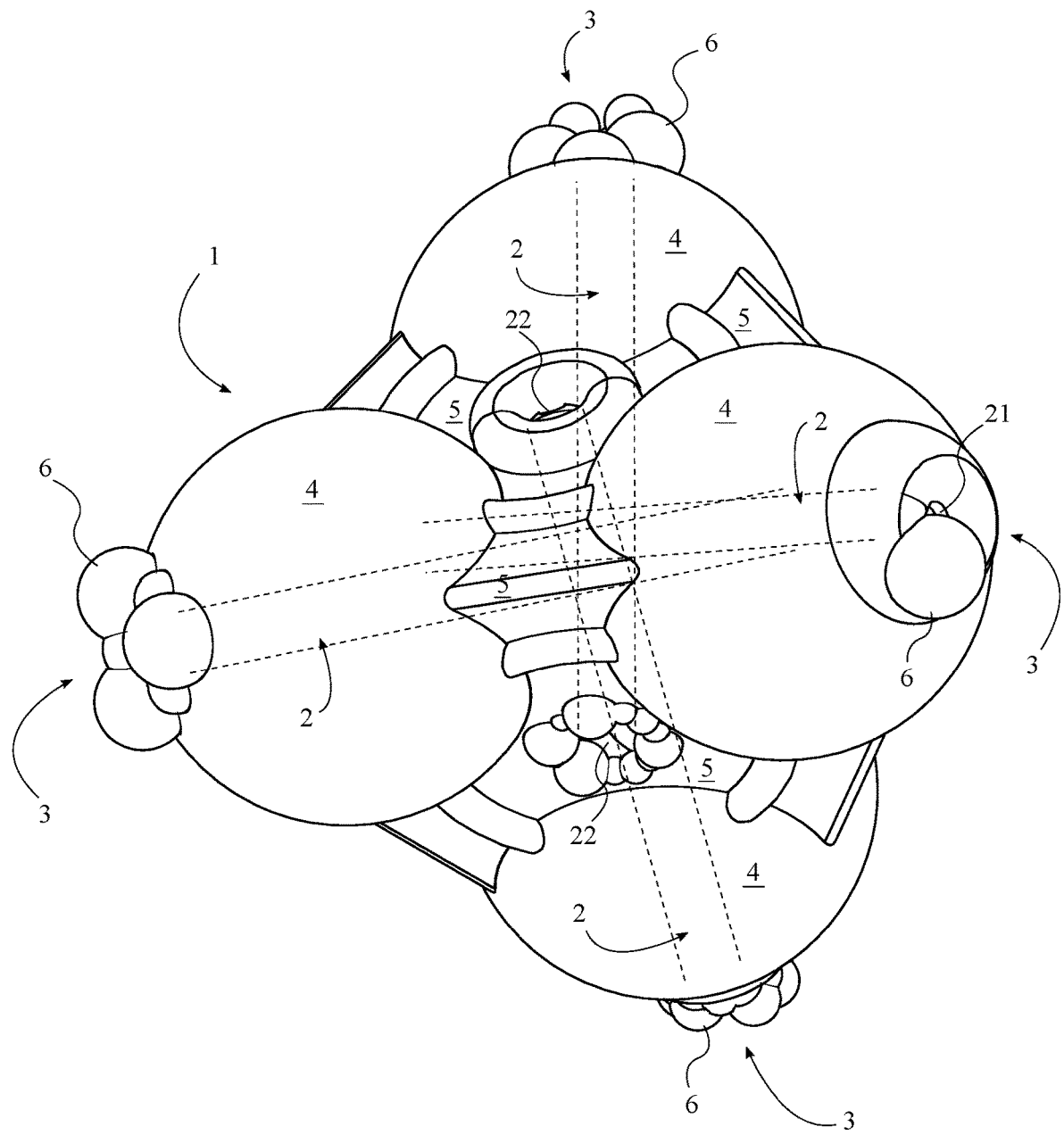
FIG. 2 is an angled perspective view of one embodiment of the present invention.

Referring to FIGS. 1-2, in general, the preferred embodiment of the present invention comprises a structural body 1 and a plurality of cavities 2. Each of the plurality of cavities 2 traverses into the structural body 1, and each of the plurality of cavities 2 is internally textured. It should be noted that hereinafter the terms cavity and tube may be used interchangeably. Each tube may be designed with its own appropriately textured massaging features as well as tube conjunctions specific to its dual entrance system, also each tube entrance is designed with its own appropriately textured design of massaging features, including different ranges of softness.

Furthermore, each of the plurality of cavities 2 intersect each other within the structural body 1. In the preferred embodiment, the structural body 1 is made of an elastic material. More specifically, the structural body 1 and its various components, including the inner walls of the plurality of cavitites, are made from a soft, elastic material, such as, but not limited to, an ultra-soft medical grade elastomer, or medical grade silicone rubber, or a similar material. Various portions of the present invention may have different degrees of softness or stiffness, as desired. For example, in some embodiments an outside layer is comprised of a harder, but still elastic, layer of material, whereas inner layers or sections of the present invention are made of much softer material for massaging purposes. The harder outer layer may also act as a gripping surface while the device is held in the user's hands, as well as acting as support for the inner softer layer and the entire device in general.

In some embodiments of the present invention, the structural body 1 has a polyhedral shape, and thus comprises a plurality of vertices 3. In some embodiments, each of the plurality of cavities 2 traverses into the structural body 1 at one of the plurality of vertices 3. In the preferred embodiment, the polyhedral shape is a tetrahedron, also known as a triangular pyramid, and thus the plurality of vertices 3 comprises four vertices 3, and the plurality of cavities 2 correspondingly comprises four cavities 2. The proposed invention is intended to have an overall outer shape that relates to simple geometric 3-dimensional structures including, but not limited to: pyramid, cube, sphere, geodesic structures, hemispherical, icosahedron.

In some embodiments, the structural body 1 further comprises a plurality of support protrusions 4. In some embodiments, each of the plurality of support protrusions 4 is positioned at one of the plurality of vertices 3. In some embodiment, each of the plurality of support protrusions 4 is spherical. In some embodiments, the plurality of support protrusions 4 may be positioned at other locations on the structural body 1, and may comprise shapes other than spherical such as, but not limited to, ellipsoidal or polyhedral. In the preferred embodiment, the plurality of support protrusions 4 being positioned at the vertices 3 and the nature of the tetrahedral nature of the structural body 1 results in the present invention being able to rest securely on a surface. Furthermore, the protruding nature of the support protrusions 4 allows the more central portions of the present invention to be separated from the resting surface, allowing full airflow coverage to all parts of the present invention for drying.

In some embodiments, the structural body 1 further comprises a plurality of structural support areas 5. The structural support areas 5 are distributed around the structural body 1 between the plurality of vertices 3. More particularly, the structural support areas 5 are connected between the support protrusions 4, creating a generally pyramidal structure with spherical portions at the vertices 3. The structural support areas 5 may be generally flat, or may be curved, and may comprise additional surface features such as, but not limited to, ribbing, bumps, channels, holes, or other protrusions or textural features. In embodiments where the structural body 1 is a tetrahedron, the structural support areas 5 form generally planar surfaces opposite the vertices 3 of the tetrahedron.

In some embodiments, one or more of the plurality of cavities 2 traverses completely through the structural body 1. Thus, each of the plurality of cavities 2 comprises a first aperture 21 and a second aperture 22, wherein the first aperture 21 and the second aperture 22 of each of the plurality of cavities 2 traverse into the structural body 1 opposite each other across the structural body 1. In some embodiments, the first aperture 21 of each of the plurality of cavities 2 traverse into the structural body 1 at one of the plurality of vertices 3 of the structural body 1. In embodiments where the structural body 1 is a tetrahedron, the second aperture 22 of the cavities 2 traverse into the structural support areas 5 opposite the first aperture 21. Thus, in some embodiments, the first aperture 21 traverses through one of the plurality of support protrusions 4, and the second aperture 22 traverses through a corresponding and opposite one of the structural support areas 5 for each of the plurality of cavities 2.

In some embodiments, one or more of the plurality of cavities 2 are generally cylindrical in shape and traverse in a generally straight line through the structural body 1. In some embodiments, one or more of the plurality of cavities 2 may be curved in various ways or otherwise not take a generally straight path into or through the structural body 1.

Having the plurality of cavities 2 intersecting with each other provides the potential for separate texture experiences, with the ability to deviate from one cavity into another at the intersection at the center of the device. Thus, the number of separate texture experiences possible is dictated by the number of cavities 2. Multiple routes of direction and texture can be chosen by the user while having entered only a single cavity entrance. Each tube is designed with its own appropriately textured massaging features as well as tube conjunctions specific to its dual entrance system, also each tube entrance is designed with its own appropriately textured design of massaging features, including different ranges of softness.

In some embodiments, a plurality of external texture features 6 is further comprised. The external texture features 6 may be, but are not limited to, protrusions, arrangements of protrusions, bumps, ridges, divots, or other similar features arranged in close proximity to each other. In some embodiments, each of the plurality of external texture features 6 is externally positioned on one of the plurality of support protrusions 4. Wherein the first aperture 21 of each of the plurality of cavities 2 is positioned at one of the plurality of vertices 3, each of the plurality of external texture features 6 is positioned around the first aperture 21 of one of the plurality of cavities 2. Each of the plurality of external texture features 6 is intended to provide an additional unique texture experience for the user. Each of the plurality of external texture features 6 may comprise unique and different texture arrangement from each other. In some embodiments, some of the plurality of external texture features 6 are also positioned around the second cavity for each of the plurality of cavities 2.

Figure 3:
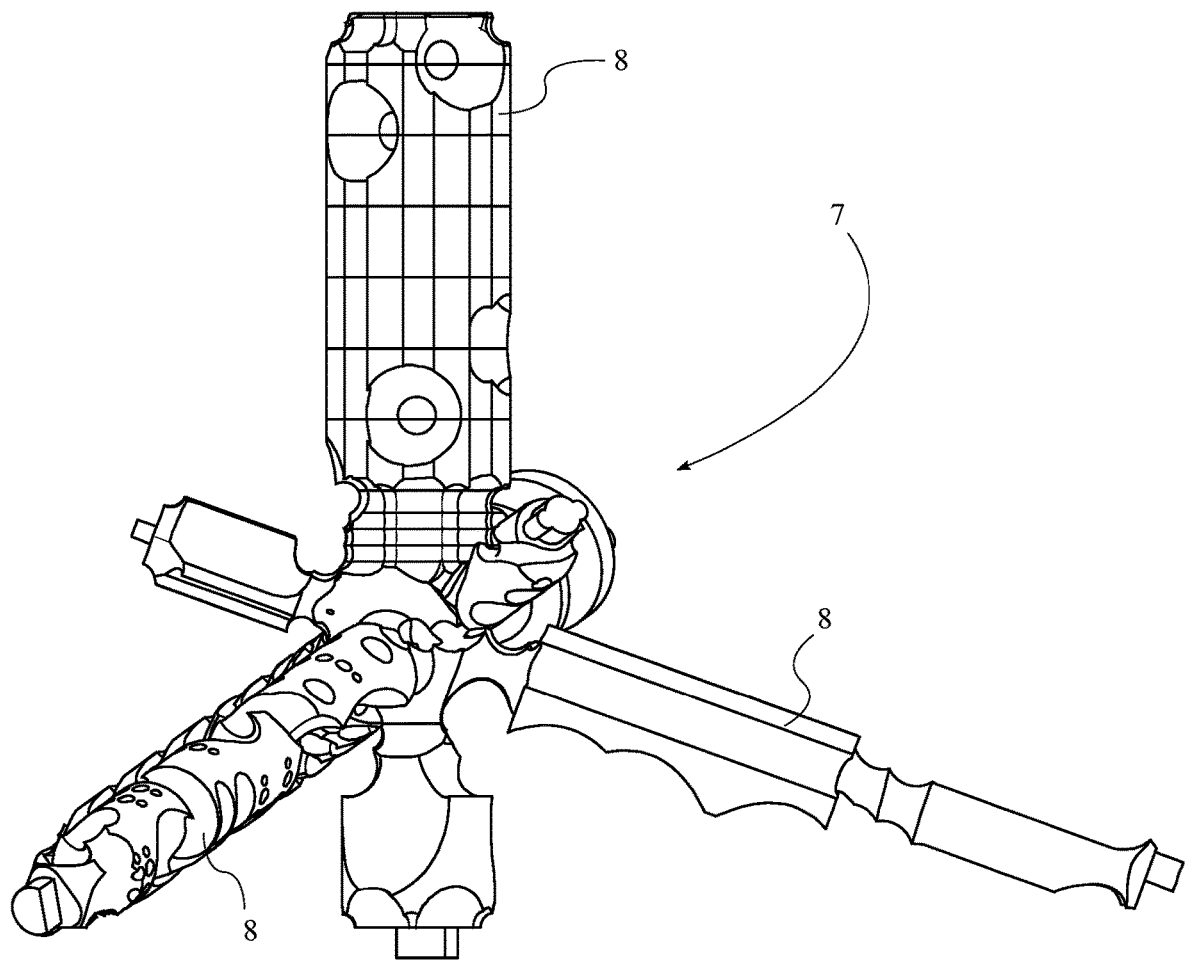
FIG. 3 is a depiction of an internal mold structure used to create one embodiment of the present invention.
Figure 4:
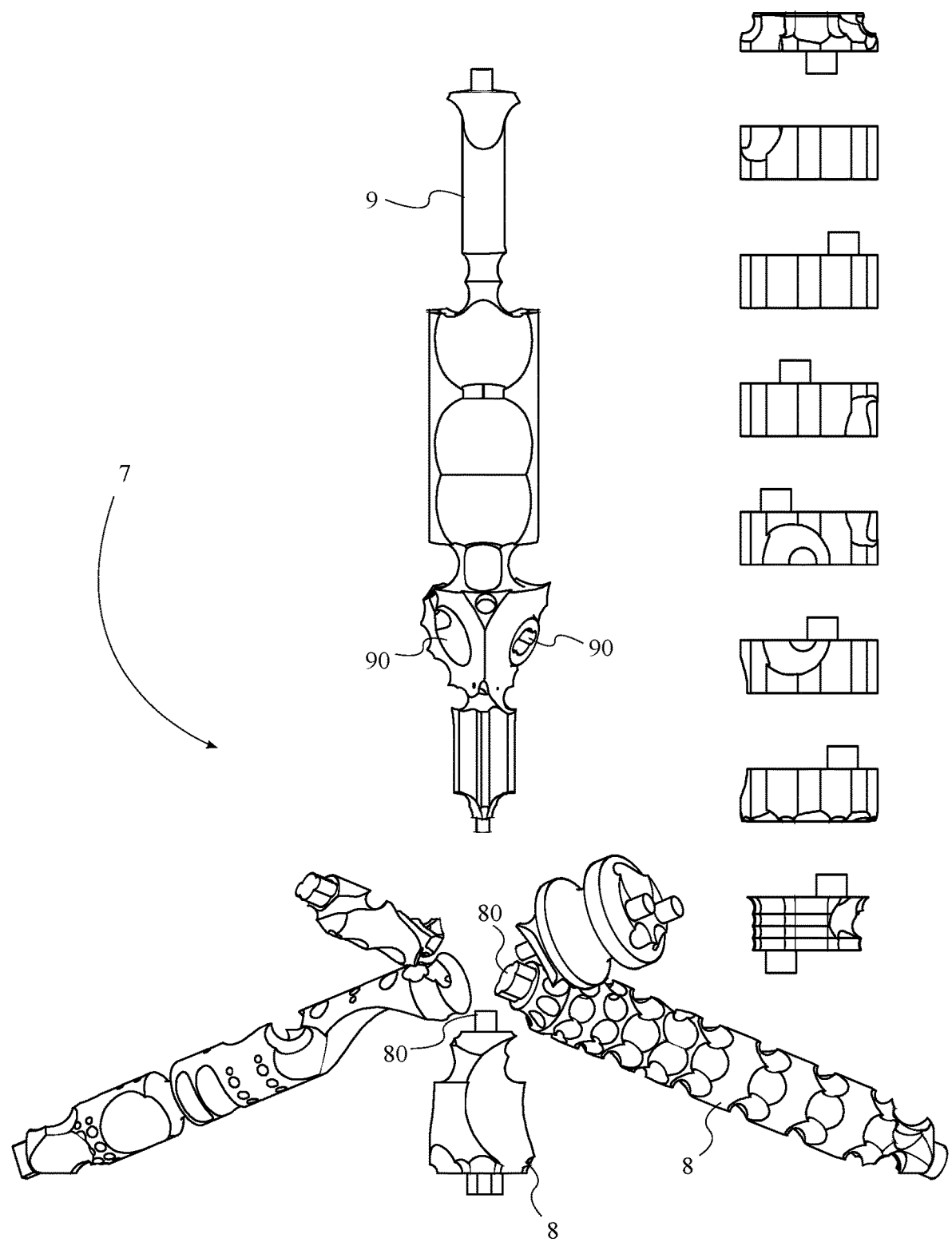
FIG. 4 is a depiction of the internal mold structure in a disassembled state.

In some embodiments, the physical structure of the present invention is formed through an injection molding process. Referring to FIGS. 3-4, an inner mold structure 7 is formed by attaching together several mold arms 8 together in a customizable arrangement. The mold arms 8 are a negative image of the plurality of cavities 2, and may be customized with any desired texture features. Texture features within the cavities 2 such as bumps or ridges are formed through depressions or cut outs in the mold pieces. A central mold piece 9 comprises a plurality of slots 90. Each mold arm comprises a protrusion 80 which fits into one of the slots. The position and orientation of the slots determines the final geometry of the structural body 1. For example, the central mold piece 9 may comprise four slots, each corresponding to one of the vertices 3 of the tetrahedron geometry of the structural body 1. One or more of the mold arms 8 may comprise a plurality of separable mold pieces that can be stacked on top of each other in order to form a full mold arm structure.

Figure 5:
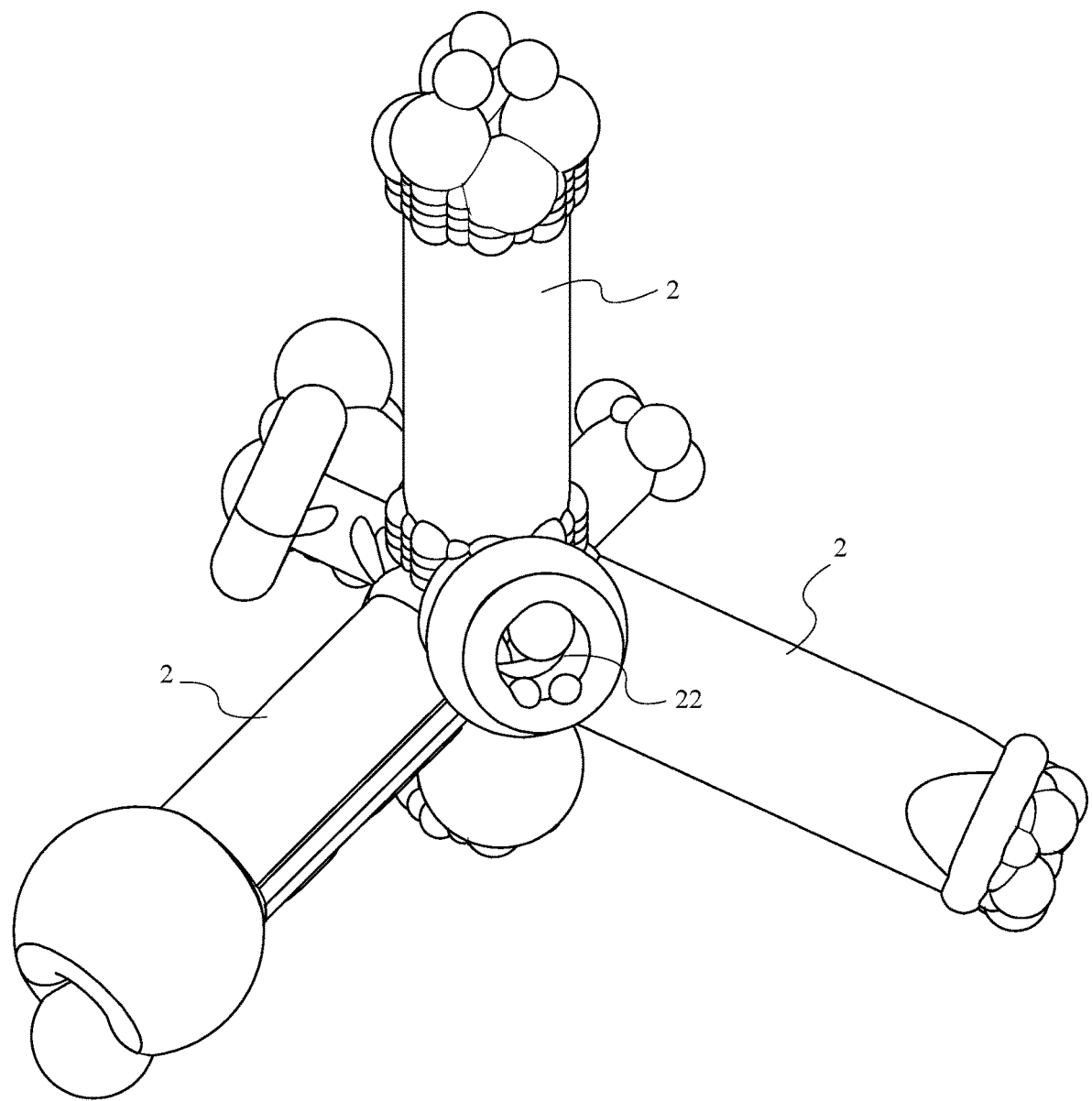
FIG. 5 is a depiction of an internal soft material structure after a molding process.

In the process of creation, first the outer layer is formed with a harder softness layer of material by use of injection molding. Then, by removing the inner mold diaphragm, the remaining inner area may be filled in with a much softer massaging material. FIG. 5 is a depiction of the inner soft filling material. This softer filling material also seals the seam left by the mold for the previous injection process for the harder outer layer and the entire device is now comprised as one inseparable soft-solid device.

Figure 6:
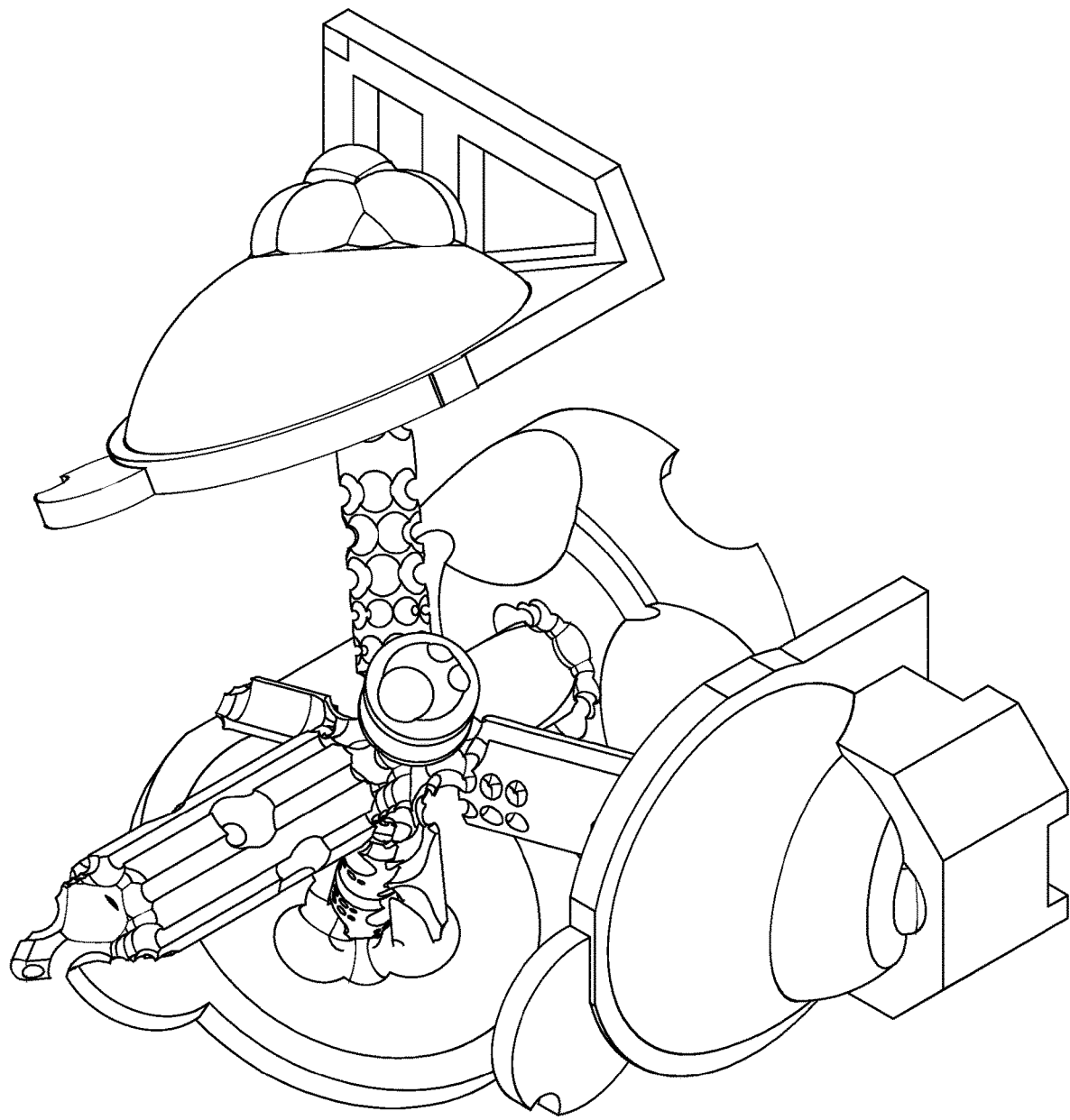
FIG. 6 is a depiction of the internal mold connected to an outer mold shell.
Figure 7:
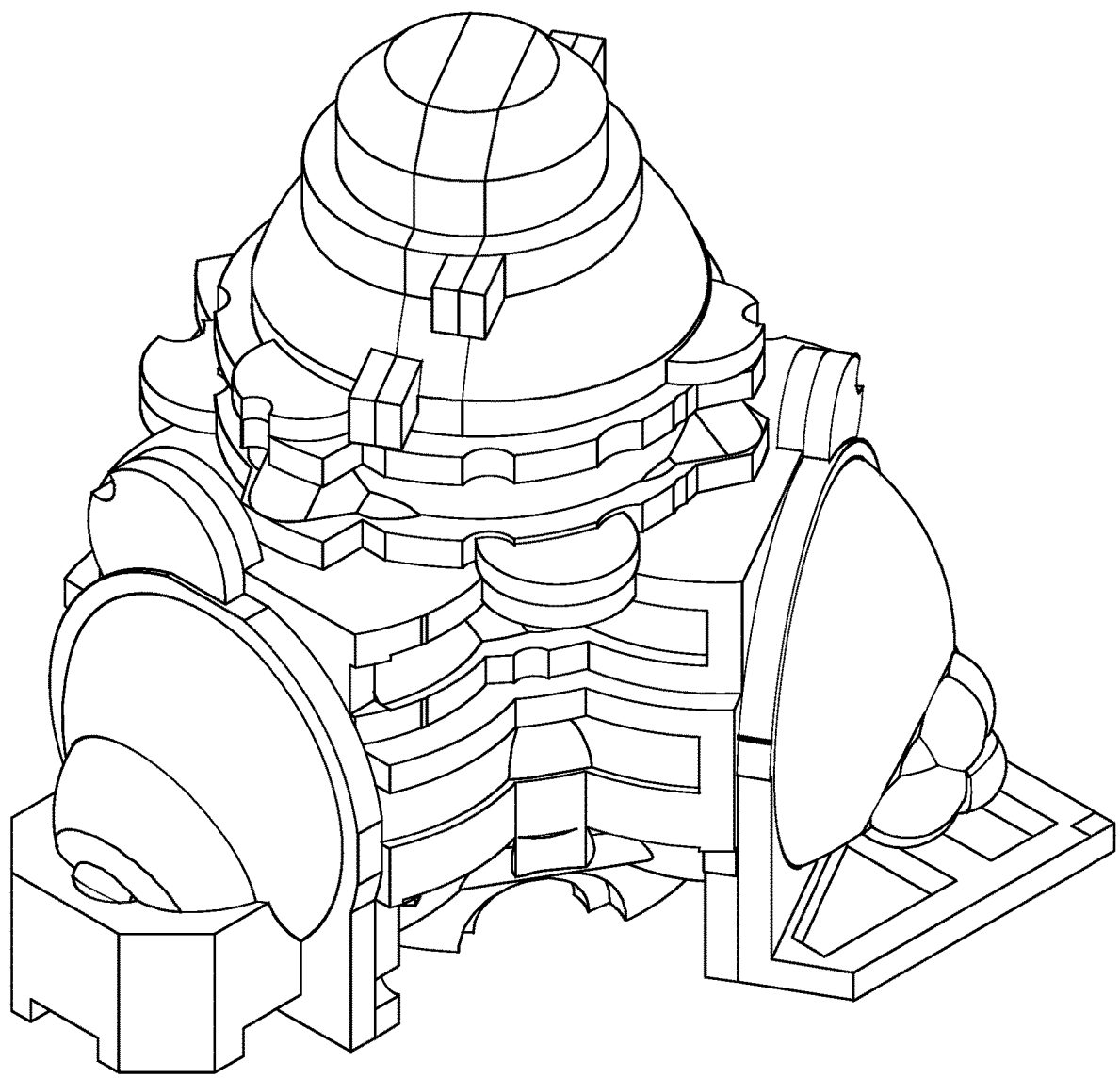
FIG. 7 is a depiction of an outer shell of a complete mold in one embodiment.

The same process is used for adding different sections of softness or hardness to the internal and external structure of the device. A variation of this process includes simply creating the outer harder layer as an empty bubble, and then the user can decide which set of pre-designed textures can be inserted into the soft yet harder containment bubble/shell. The mold of the device is specially designed with various hand sculpted and three-dimensional computer design programs, and then formed with precast aluminum sections. FIG. 6 is a depiction of an example of how the inner mold structure can be connected to an outer mold shell in one embodiment. FIG. 7 is a depiction of an example of an entire outer shell of the complete mold in one embodiment.

One specific attribute is the intersecting texture sections, including the outer sections of the molds shell that also intrude into the middle portion of the proposed device, as they are built for being able to be separated while still inside the device after all of the soft material has been injected into the mold, as with the amount of lengthy sized and oddly shaped parts of the mold that are dwelling at the center and throughout the entire device after pouring the soft material. The device would have to be cut open for the remaining pieces that reside to be removed, hence having the sections that reside at the center of the mold be pre-sized and fitted with disconnectable joints that allow for the sections to be removed without damaging the device once completed via the various entrances of the device, and allows for the designer to develop much more complicated internal shapes without causing physical harm to the final shaped product while keeping the integrity of the product at the highest level.

One embodiment of the device includes a system of one part being the main section of soft material(s) that have been specially designed to fold together as well as separate all while being continually connected in one or multiple areas within the design.

While the entire device is folded or rolled together, this system includes a type of surrounding grid containment net that allows the user to enter the densely folded massaging system without it unfolding. The densely folded system is first folded, and then inserted into the surrounding grid containment system, as the grid containment system is made of a much harder form of the soft material, though the grid containment system is still soft enough to allow the user to encourage vigorous use, and prevents any type of potential bruising or injury that could possibly be caused by a completely hard containment system.

Figure 8:
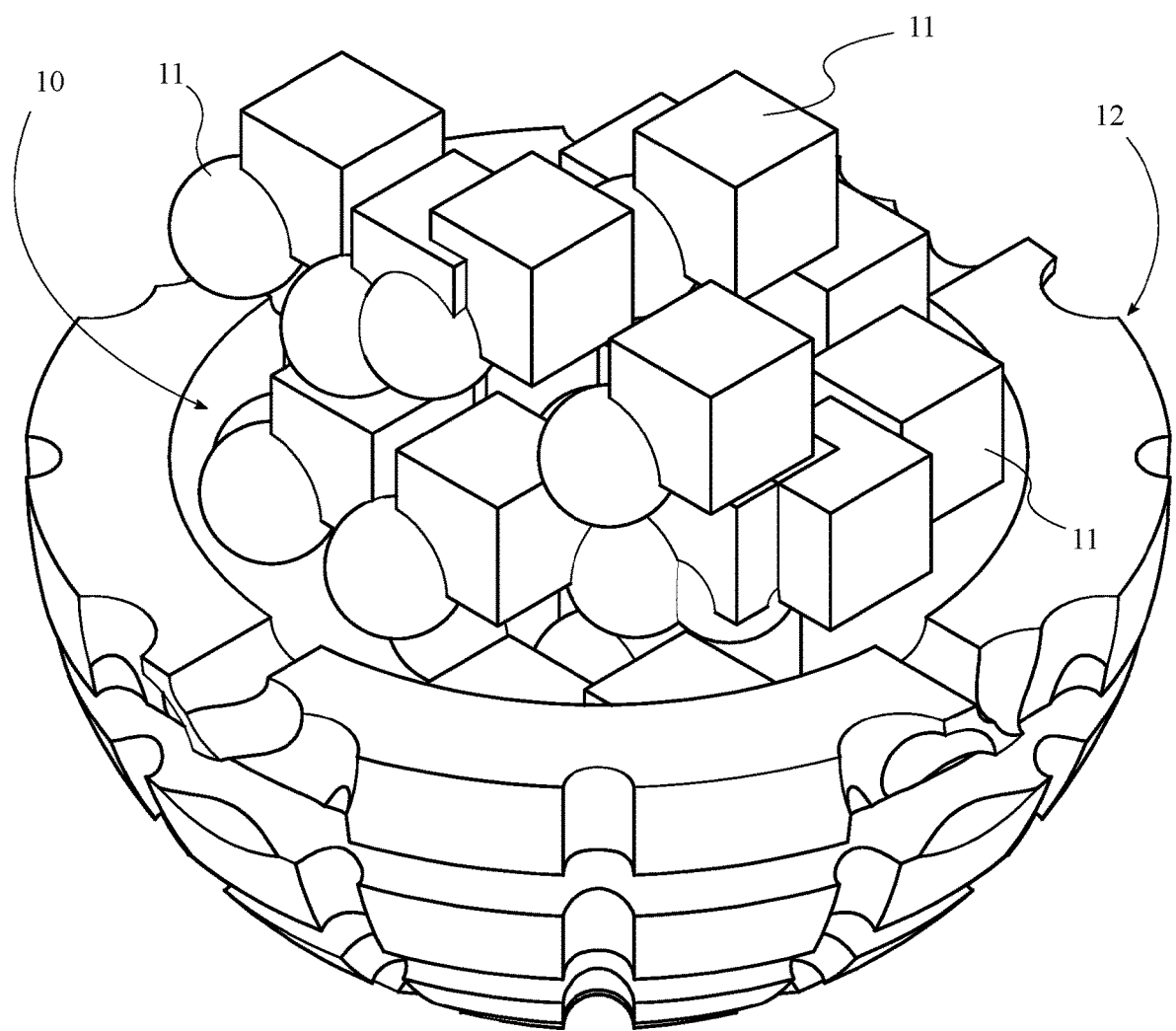
FIG. 8 is a depiction of a container type cavity embodiment in an opened state.
Figure 9:
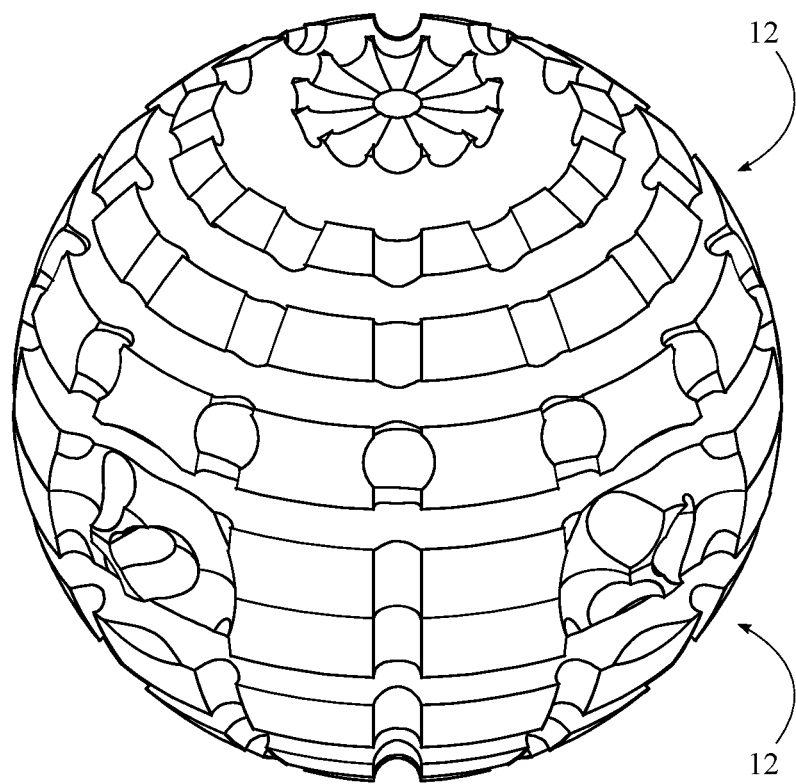
FIG. 9 is a depiction of the container type cavity embodiment in a closed state.

Therefore, referring to FIGS. 8-9, in one embodiment, alternatively or additionally to one or all of the mold arms 8, a container type cavity may be utilized. In some embodiments, the container cavity 10 is spherical, though the geometry of the container mold may vary in various embodiments. In some embodiments, a container cavity 10 mold is used to replace one or more of the mold arms 8 before the molding process. In some embodiments, a container cavity 10 is a replacement for one or more of the plurality of tube-type cavities in the finished product. Within the container cavity 10, a plurality of texture sections 11 may be customizably placed, arranged and/or connected together. The plurality of texture sections 11 may be, but are not limited to, shapes such as spheres, squares, tubes, or any other shapes. The texture sections 11 are inserted into the container cavity 10 in order to create a highly versatile and varied randomized grid of shapes and textures within the container cavity 10.

In some embodiments, the container cavity 10 comprises a means to access the container cavity 10 in order to place the texture sections 11 within the container cavity 10 in a customizable manner. In one embodiment, the container cavity 10 comprises two hemispherical sections 12 that can be removably attached to each other. In one embodiment, the container cavity 10 comprises one or more flap sections that can simply be lifted or folded in order to access the interior of the container cavity 10. In some embodiments, the container cavity 10 comprises a variety of textural features on the exterior wall of the container cavity 10, such as grooves, ridges, or bumps.

Figure 10:
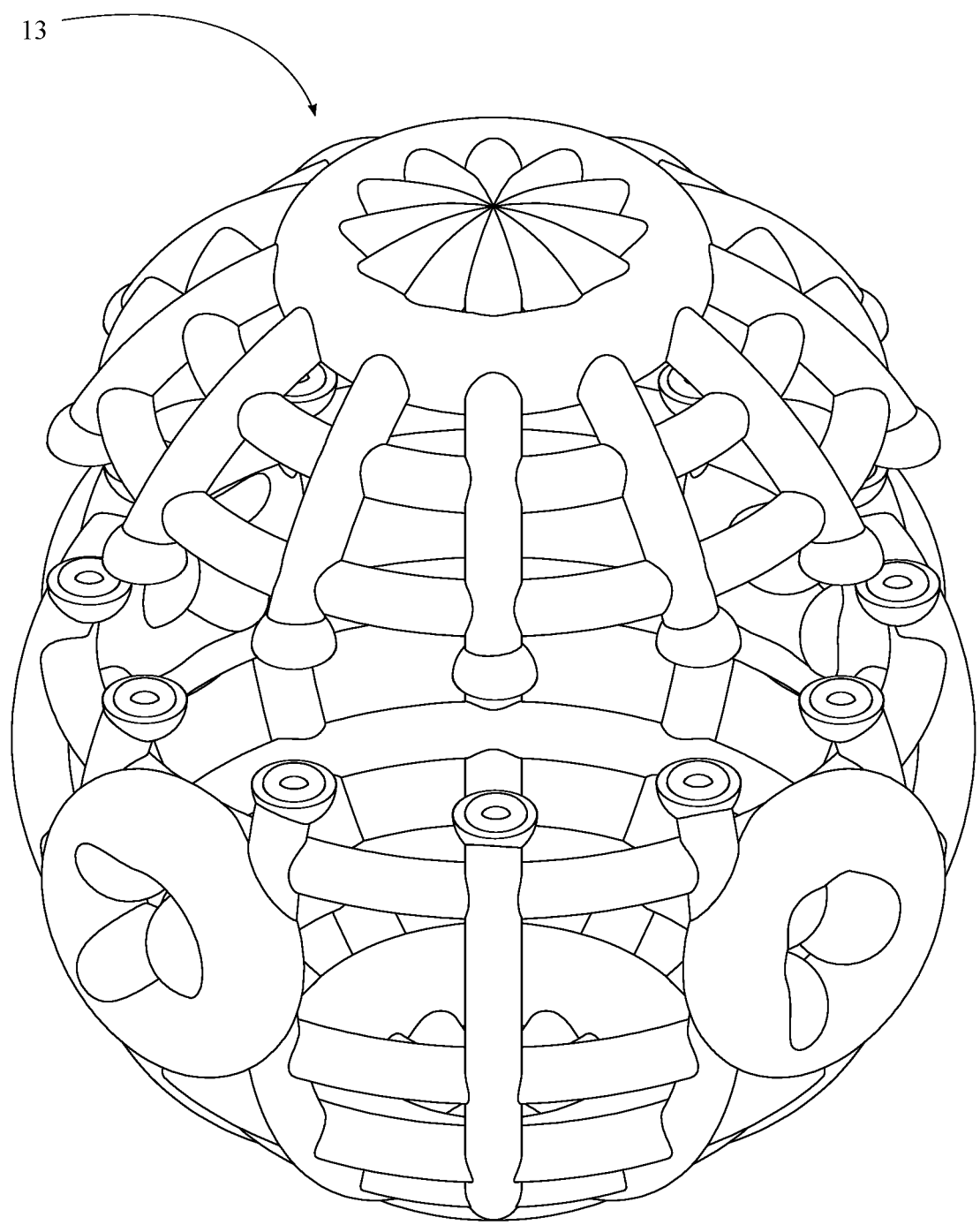
FIG. 10 is a depiction of a container support grid for the container cavity embodiment.

In some embodiments, the container cavity 10 is a separate apparatus that can be connected and disconnected from the main structural body 1. As seen in FIG. 10, some embodiments further comprise a container support grid 13 that can be secured around the container cavity 10 for further structural support, the container support grid 13 further comprising textured apertures that correspond to the entrances to the container cavity 10 itself. The container support grid 13 may comprise two sections that can be connected together through one or more clips, buttons or other fastener types.

One embodiment of the system includes a collection of small disconnected segments of tubular and non-tubular massaging texture sections, each of the sections designed with a fastening system that allows the user to conjoin the collection of textures in the order they wish to use at that time. Each texture is designed for having its own type of softness and textures or combined sections of softness's and textures, allowing for a larger set of variations in texture and experience, also allowing more of a random set of unexpected textures, which can be perceived as a more enjoyable experience in some cases and when compared to a singularly whole texture that is made of a singular piece of material that doesn't ever change texture.

Figure 11:
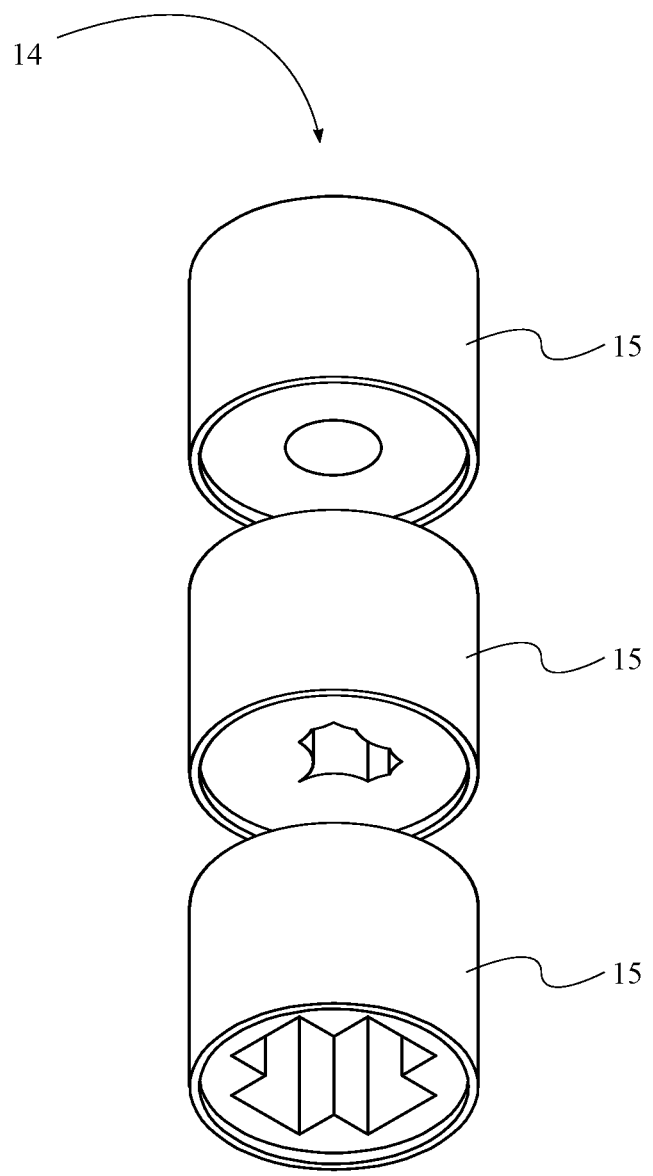
FIG. 11 is a depiction of a segmented cavity section embodiment in an exploded state.
Figure 12:
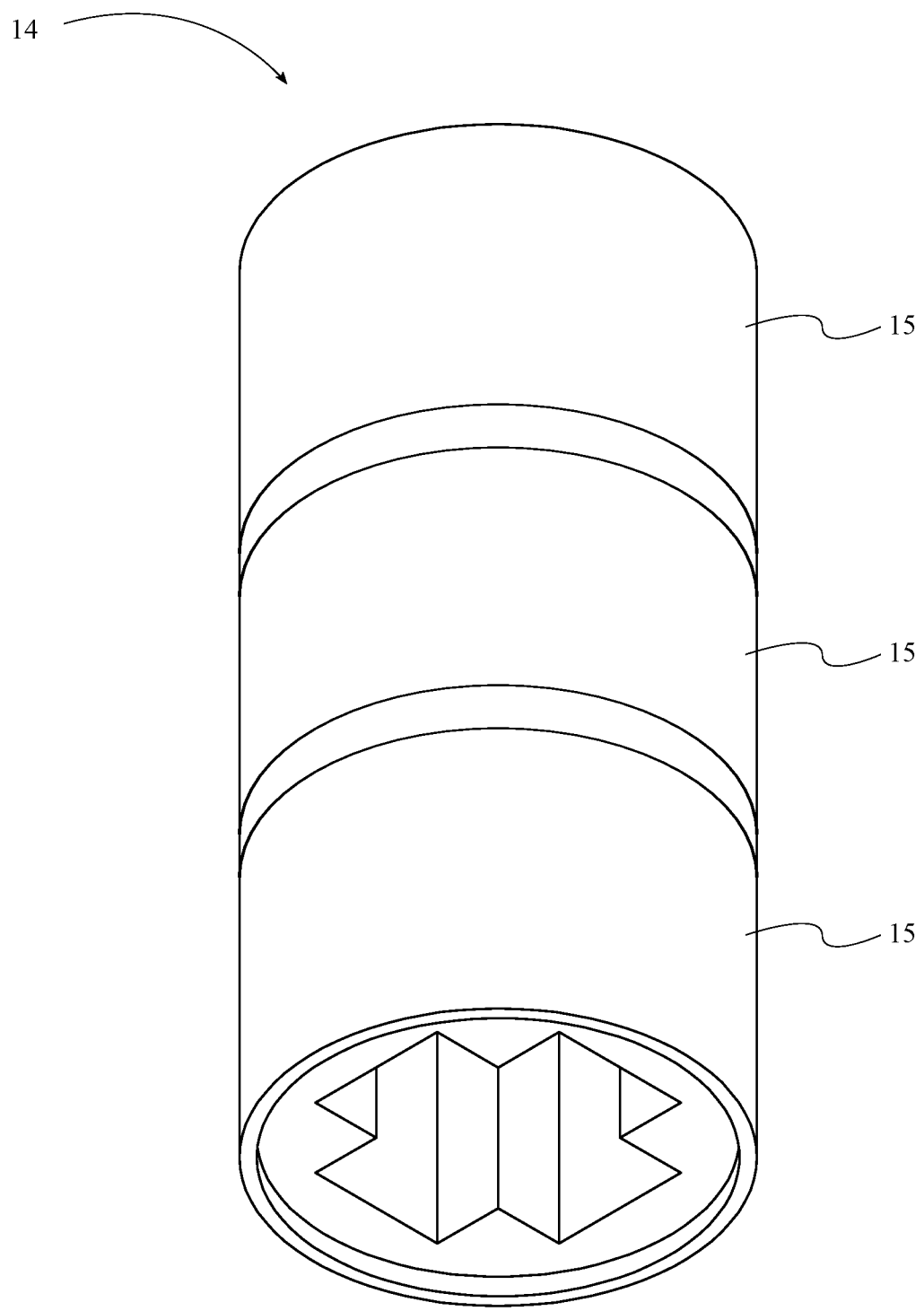
FIG. 12 is a depiction of the segmented cavity section in an assembled state.

Therefore, in reference to FIGS. 11-12, in some embodiments, a segmented cavity section 14 is further comprised. Similar to the container cavity 10, the segmented cavity section 14 may be used in lieu of one of the mold arms 8 during the molding process, or the segmented cavity section 14 may be removably attachable to the structural body 1, or the segmented cavity section 14 may be integrated into the present invention in another way. The segmented cavity section 14 comprises a plurality of cavity segments 15 that can be connected and arranged together in series in a customizable fashion and in any order. Each of the cavity segments 15 has a different cross-sectional shape and/or internal texture, allowing the user to customize their experience. In one embodiment, the cavity segments 15 have a hollow outer shell encasement made of a semi-hard material with connectable ends, each shell encasement having connectable ends and being filled with a soft massaging inner texture material with different internal arrangements.

One embodiment is a texture system that creates a type of internal maze structure experience for the user of the device.

Furthermore, a separate stand for the device has been designed to specifically allow the device to rest securely in a position that allows the device to not touch any surface that is not the stand.

The stand also acts as a proper drying system and allows for any remaining moisture to evaporate from the device as it is resting in the stand, as the stand is very porous and made with a net like structure so that moisture may easily evaporate off of any surface of the invented device.

In addition, the stand may also include a built in heated fan with an on/off timer to encourage proper ventilation for encouraging the best possible system for evaporation so that the device has removed all possible water so that undesired growth of any type including but not limited to bacteria, mold, or fungus to be discouraged from growing inside or outside of the device. The heated fan system may also act as a warming feature for preparing the device for comfortable use.

For the empty fillable bubble embodiment, the specially designed textures can be placed inside the bubble in either a random order, or in an order that is pre-designed for having each piece of the textures to fit seamlessly inside of the bubble.

One purpose of the multiple intersecting tubes is to allow for causing an automatic bending attribute to any object that is inserted into the device.

In summary, the present invention is designed to have an expanded set of abilities that include the ability to allow a user or multiple users to change pathways while inside the device, as there are many intersecting tubes that go throughout the device, also causing throat-like cavities to occur. Based on the system the user has chosen for use, the user can decide between a solid structure with a large number of entrances, textures, intersecting tubes, and different amounts of softness of material, or decide to use a type of fillable bubble system in which the user can fill a soft bubble structure or connectable tube structure with a variety of textured structures for a more randomized or maze like experience, further there is a foldable system that is held together by a type of grid containment system. There is a specially designed stand for allowing the invention to dry after washing, as well as be warmed before use. The invention is specially designed to not have any actual hard features, to allow the user the ability of vigorous use without the risk of bruising or injury within the range of proper use. The invention is achieved by use of a set of special production and design methods.

Although the invention has been explained in relation to its preferred embodiment, it is to be understood that many other possible modifications and variations can be made without departing from the spirit and scope of the invention as hereinafter claimed.

What is claimed is:
1. A multi-feature adult massager comprising:
    a structural body;
    a plurality of cavities;
    a plurality of external texture features;
    the structural body being made from an elastic material;
    each of the plurality of cavities traversing into the structural body;
    each of the plurality of cavities being internally textured;
    each of the plurality of cavities intersecting each other within the structural body;
    the structural body having a polyhedral shape;
    the structural body comprising a plurality of vertices and a plurality of support protrusions;
    each of the plurality of cavities traversing into the structural body at each of the plurality of vertices;
    a longitudinal axis of each of the plurality of cavities being angularly offset from each other;
    each of the plurality of cavities intersect each other within the structural body;
    each of the plurality of support protrusions being positioned at each of the plurality of vertices such that the structural body has a multi-nodal shape; and
    each of the plurality of support protrusions being entirely spherical.
2. The multi-feature adult massager as claimed in claim 1, wherein:
    the plurality of vertices comprises four vertices, and wherein the polyhedral shape is a tetrahedron.
3. The multi-feature adult massager as claim 1, wherein:
    each of the plurality of cavities comprises a first aperture;
    the first aperture of each of the plurality of cavities traverses into the structural body at one of the plurality of vertices; and
    the plurality of external texture features are positioned around the first aperture of one of the plurality of cavities.
4. The multi-feature adult massager as claimed in claim 3, wherein:
    each of the plurality of cavities comprises a second aperture; and
    each of the plurality of cavities traverses through the structural body, wherein the second aperture traverses into the structural body opposite to the first aperture across the structural body.
5. The multi-feature adult massager as claimed in claim 1, wherein:
    the structural body comprises a plurality of structural support areas; and
    the structural support areas are distributed around the structural body between a plurality of vertices of the structural body.

* * * * *